United States Patent [19]
Klein

[11] 3,838,320
[45] Sept. 24, 1974

[54] MULTIPLE LAYER CAPACITORS
[75] Inventor: Samuel J. Klein, Dix Hills, N.Y.
[73] Assignee: American Technical Ceramics, a Division of Phase Industries, Inc., Huntington Station, N.Y.
[22] Filed: Jan. 4, 1974
[21] Appl. No.: 430,706

[52] U.S. Cl. ................................ 317/261, 317/242
[51] Int. Cl. ............................................. H01g 3/07
[58] Field of Search ............................ 317/261, 242

[56] References Cited
UNITED STATES PATENTS
3,740,624   6/1973   McAdams .......................... 317/261
3,745,431   7/1973   Imamura ............................ 317/261

Primary Examiner—E. A. Goldberg
Attorney, Agent, or Firm—Edward H. Loveman

[57] ABSTRACT

A multiple layer capacitor for use at high frequencies has a plurality of conductive plates or electrodes embedded in spaced parallel disposition in a dielectric block. The capacitor has increased current handling capacity, higher Q and lower internal series resistance than conventional capacitors of the same size and capacitance due to arrangement of plates between end plates as one or more closely spaced pairs. The spacing between plates of each pair is negligibly small as compared with the spacing between the pairs of plates and the end plates, and each of the pair of plates is connected to the same terminal.

12 Claims, 8 Drawing Figures

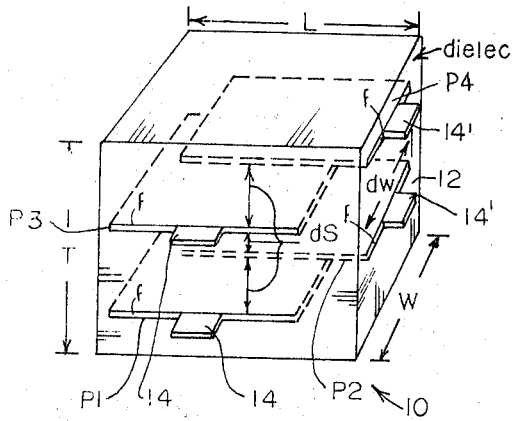
FIG.1 PRIOR ART
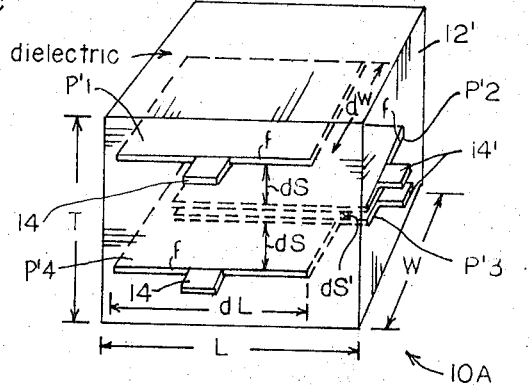
FIG.3
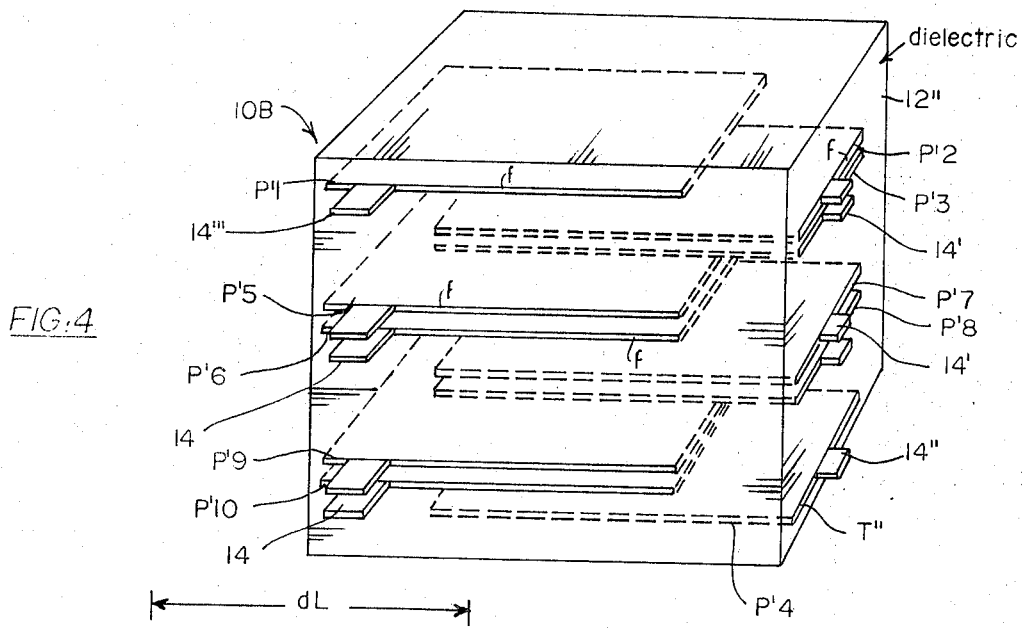
FIG.4
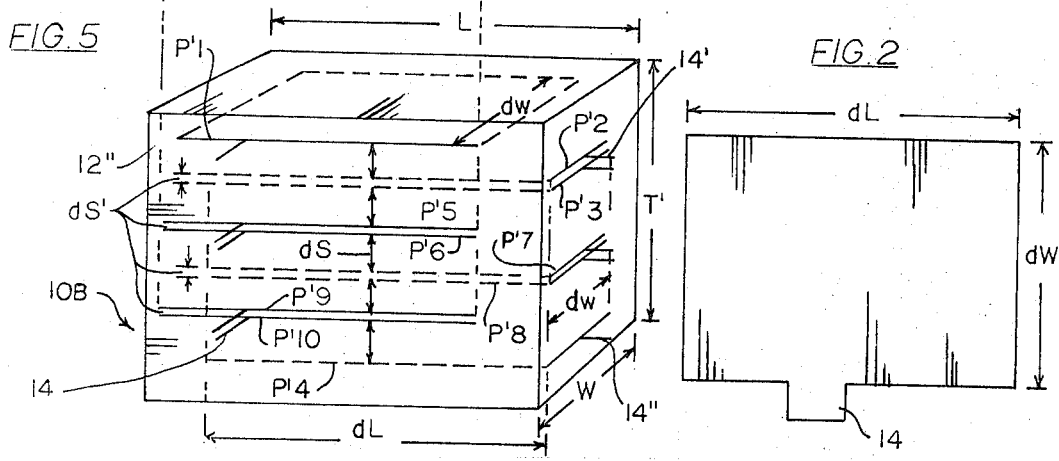
FIG.5
FIG.2

MULTIPLE LAYER CAPACITORS

This invention relates to the art of multi-electrode capacitors and more particularly concerns capacitors of the type employing spaced thin electrodes embedded in dielectric blocks and used at higher frequencies, and more specifically concerns improved multiple layered capacitors having closely spaced internal electrodes of the same polarity.

In a conventional multiple layer capacitor, current handling capacity is limited by the maximum permissible dissipation:

$P_D = I^2 R_S$, where $P_D$ = power dissipation appearing as heat; (limited by maximum permissible dielectric temperature)

I = the current of the capacitor;

$R_S$ = the equivalent series resistance; (partially made up of dielectric losses and electrode resistance;

The Q factor of the capacitor is:

$Q = X_C/R_S$, where $X_C$ = the capacitance reactance; and $R_S$ = the equivalent series resistance.

It will be apparent from the foregoing that the equivalent series resistance is a determining factor in establishing the maximum power dissipation, and the Q which is a figure of merit.

The principal object of the present invention is to provide an improved multiple layer capacitor construction which provides the following advantages over prior known capacitors of this type:

1. Increased current handling capability.
2. No required increase in electrode thickness.
3. Minimal or no increase in overall thickness of the capacitor.
4. Decreased electrical stress on the dielectric.
5. Inductive effects and fringing effects are minimized.
6. Capacitance can be determined by using standard design tables, with minimal corrections for fringing effects.
7. No increase in length or width of electrodes is required.
8. The capacitor has lowered internal series resistance which results in increased current handling capacity and higher Q.
9. The capacitor can have an even number of electrodes arranged to provide the capacitance effect of an odd number of electrodes.

Another object of the present invention is to provide a multiple layer capacitor in which the above enumerated advantages are obtained by employing double or paired internal plates or electrodes in which each double electrode comprises two closely spaced electrodes connected to the same terminal.

These and other objects and many of the attendant advantages of this invention will be readily appreciated as the same becomes better understood by reference to the following detailed description when considered in connection with the accompanying drawings in which:

FIG. 1 is a perspective view of a typical multilayer capacitor known in the prior art;

FIG. 2 is a plan view of a capacitor plate or electrode used in the capacitors of FIGS. 1, 3 and 4.

FIG. 3 is a perspective view of a multilayer capacitor embodying the present invention;

FIG. 4 is a perspective view of another multilayer capacitor embodying the invention, on a larger scale than those of FIGS. 1 and 3;

FIG. 5 is a diagrammatic representation of the capacitor of FIG. 4, used in explaining the invention.

Figure 6:
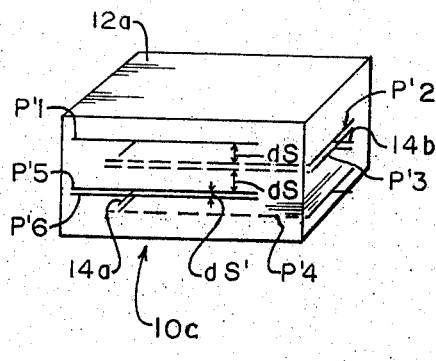
FIGS. 6, 7 and 8 are diagrammatic representations of other multilayer capacitors embodying the invention.

Referring now to the drawings wherein like reference characters designate like or corresponding parts throughout, there is illustrated in FIG. 1 a multilayer capacitor generally designated as reference numeral 10 of known type. The capacitor 10 has a body in the form of a dielectric block 12 made of low loss ceramic plastic or other dielectric material. The block has a length L, width W and thickness T. Embedded in the block are four spaced conductive plates P1, P2, P3 and P4. The plates P1 and P3 have electric terminals in the form of forwardly extending ends 14 which may be connected to one of two terminals of a high frequency power supply. Terminal ends 14' of the plates P2, P4, extend laterally and may be connected to the other terminal of the power supply. The plates P1 and P3 extend inwardly from the left side of the block 12 while the plates P2 and P4, are alternately disposed with respect to the plates P1, P2 and extend inwardly from the right side of the block 12. Only the terminal face "f" of each plate is exposed, the remaining faces of each plate are buried in the dielectric. The capacitor plates or electrodes P1–P4 are all of substantially equal length dL width dW and spacing dS (see FIG. 2). In this conventional multilayer capacitor, current handling capacity is limited by the permissible power dissipation which is determined by the internal series resistance as stated above.

The capacitance of capacitor 10 can be approximately expressed as follows:

$C = K [(dL \times dW)/dS] (N - 1)$, where

C = Capacitance;

K = dielectric constant of the material of block 12, and includes a unit conversion factor;

dL = electrode length;

dW = electrode width;

dS = electrode spacing;

N = number of capacitor plates.

To arrive at a more precise value of capacitance, corrections are required as is well known in the art to take into account high frequency fringing effects and inductive effects.

Referring now to FIG. 3, a block 12' of a capacitor 10A has the same length L, width W, and thickness T as the capacitor 10. The four rectangular plates or electrodes P'1–P'4 have the ame length dL and width dW as in the capacitor 10. Top and bottom electrodes P'1 and P'4 have electrical terminals in the form of the ends 14 of negligibly small size projecting forwardly of a block 12' for connecting to one terminal of a high frequency power supply. Internal electrodes P'2 and P'3 are respectively spaced the distance dS from the electrodes P'1 and P'4 respectively. The electrodes P'2 and P'3 are closely spaced apart a very short distance dS', i.e., as small as ¼ mil, in which case, the distance dS is generally not less than 1 mil. The terminal ends 14' of the electrodes P'2 and P'3 are connected to one and the same other terminal of the two terminal high frequency power supply. While this construction employs four electrodes, it is in effect a three electrode capacitor. Plates P'2 and P'3 have negligible capacitive reactance between them. Since they cooperate in carrying current from the same power supply terminals, internal series resistance $R_S$ of the capacitor 10A is reduced as much as 25 percent compared with a three electrode capacitor of the type illustrated in FIG. 1. Both fringing and inductive effects are reduced and both the Q and the current handling capability are increased. Thus a simple rearrangement of electrodes in capacitor 10A as contrasted with capacitor 10 produces all desirable effects enumerated above.

FIGS. 4 and 5 shows another capacitor 10B which utilizes the principles of this invention to provide a capacitor of greater capacitance. Here again the capacitor plates are of equal length $dL$ and $dW$. The block 12'' has a thickness T, length L and width W. The arrangement is like that of capacitor 10A and corresponding parts are identically numbered. Three additional pairs of plates or electrodes P'5, P'6, P'7, P'8 and P'9, P'10 are interposed between the upper pair of plates P'2, P'3 and the bottom plate P'4. The spacing $dS$ is maintained between the upper plate of each pair and the next adjacent higher plate, and between the lower plate of each pair and the next adjacent lower plate. The narrow spacing $dS'$ is maintained between the plates in each pair. The laterally extending tabs or electrode ends 14' can be connected along with end 14'' of bottom plate P'4 to one terminal of the high frequency power source. The forwardly extending end 14''' along with the ends of the upper plate P' 1 can be connected to the other terminal of the power source.

Capacitor 10B of FIG. 5 is in effect a 6-electrode capacitor, as contrasted with capacitor 10A which is in effect a three-electrode capacitor.

From the formula for capacitance C appearing above, it will be apparent that capacitance C of capacitor 10B is increased as much as 2-½ times since in the formula $(N - 1) = 5$ for capacitor 10B and $(N - 1) = 2$ for capacitor 10A. In calculating capacitance, each electrode pair is considered as effectively one electrode or plate. The thickness T' of capacitor 10B is increased by the spacing between the added electrodes and the thickness T'' of the added plates, i.e., $3 \times dS + 3 \times dS' + 6 \times T''$. Usually $dS'$ and T'' are negligible, so the net increase in thickness is $3dS$. The desirable effects enumerated above are all obtained. For a capacitor of prescribed thickness T', and plate separation $dS$, capacitor 10B will have greater current handling capability, less internal heating, lower internal resistance, and higher Q than a conventional capacitor with the same capacitance.

FIG. 6 shows a multilayer capacitor 10C similar to capacitor 10A and 10B but with two pairs of closely spaced conductive plates or electrodes P'2, P'3 and P'5, P'6 between opposite end plates or electrodes P'1 and P'4. The plates are embedded in a dielectric block 12a in spaced parallel disposition.

Figure 7:
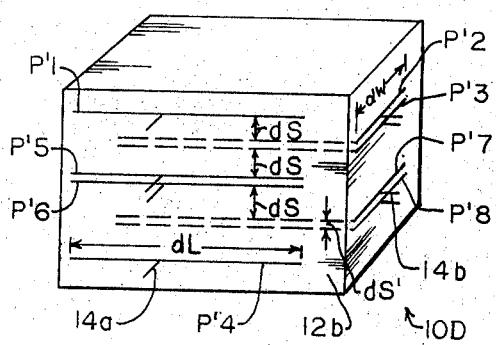

FIG. 7 shows a multilayer capacitor 10D with three pairs of closely spaced conductive plates or electrodes P'2, P'3; P'5, P'6; and P'7, P'8 between opposite end plates P'1 and P'4. All plates are embedded in dielectric block 12b in spaced parallel direction.

Figure 8:
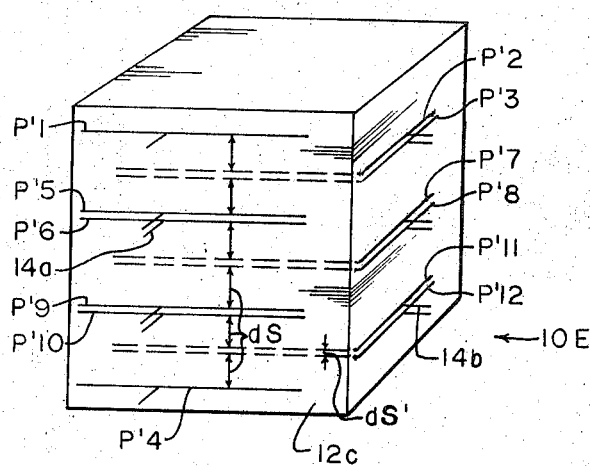

FIG. 8 shows a multilayer capacitor 10E with five pairs of closely spaced conductive plates or electrodes P'2, P'3; P'5, P'6; P'7, P'8; P'9, P'10; amd P'11, P'12 between opposite end plates P'1 and P'4, embedded in a dielectric block 12c.

In the capacitor 10C, 10D and 10E, the plates all have the same length dL, width dW and negligible thickness. The pairs are spaced the same distance dS from each other and from the end plates. All have terminal ends 14a and 14b for connecting the plates of each pair to the same terminal of a two-terminal high frequency power supply. In capacitors 10D and 10E the end plates may be connected to the same terminal of the power supply, while in capacitor 10C the end plates will be connected to different power supply terminals. The plates in each pair are spaced a negligible distance $dS'$ apart.

Capacitor 10C has six plates but in effect has four capacitive plates. Capacitor 10D has eight plates but in effect has five capacitive plates. Capacitor 10E has twelve plates but in effect has seven capacitive plates.

Although it has been illustrated in the capacitors 10B—10E that the distance $dS$ between a pair of plates and the end plate is equal to the distance $dS$ between pairs of plates, the aforementioned desirable effects can be achieved if the distance between one pair of plates and the end plate is more or less than the distance $dS$ between pairs of plates, i.e., FIG. 4 distance between P'1 and P'2 $\lessgtr$ than the distance between P'5 and P'3 (dS).

The capacitors 10A–10E may have the same length and width, but differ only in thickness, with the additional plates serving to increase capacitance. By providing double or paired plates, all the benefits and advantages of increased current handling capacity and lowered internal resistance and higher Q are obtained.

It should be understood that the foregoing relates to only a limited number of embodiments of the invention, which have been by way of example only, and that it is intended to cover all changes and examples of the invention herein chosen for the purposes of the disclosure, which do not constitute departures from the spirit and scope of the invention.

The invention claimed is:

1. A multiple layer capacitor for use at high frequencies comprising:
    a dielectric block;
    two conductive end plates embedded in said block and disposed in spaced parallel disposition near opposite sides of said block;
    a first pair of other conductive plates embedded in said block and disposed in spaced parallel disposition between and parallel to said end plates, the spacing between said pair of plates being negligibly small as compared with the spacing between each one of said pair of plates and the nearest adjacent end plate so that said pair of plates constitute effectively one capacitive plate; and
    means for connecting said pair of plates to one terminal of a two terminal high frequency power supply.

2. A multiple layer capacitor as defined in claim 1, further comprising means for connecting said end plates to another terminal of said high frequency power supply, so that said end plates and said pair of plates comprise in effect a capacitor with three electrodes.

3. A multiple layer capacitor as defined in claim 1, further comprising a second pair of conductive plates embedded in said block and disposed in spaced parallel disposition between and parallel to one end plate and one plate of said first pair of plates for increasing the overall capacitance of said capacitor, the spacing between said second pair of plates being negligibly small as compared with the spacing between said one end plate and said one plate of said first pair of plates.

4. A multiple layer capacitor as defined in claim 3, further comprising means for connecting said one end plate to said one terminal of said power supply and means for connecting said second pair of conductive plates and the other end plate to the other terminal of said power supply, so that said end plates and said conductive plates constitute in effect a capacitor with four electrodes.

5. A multiple layer capacitor as defined in claim 1, further comprising a plurality of other pairs of conductive plates embedded in said block and disposed in spaced parallel disposition between and parallel to said one end plate and said one plate of said first pair of plates for increasing the overall capacitance of said capacitor, the spacing between said plates of each other pair thereof being negligibly small so that each of said other pair of plates effectively constitute a single capacitive plate, the spacing between said plates of each of said other pair thereof being also negligibly small as compared with the spacing between all the pairs of plates and between the respective end plates and adjacent pairs of plates;

means for connecting both plates of at least one of said other pairs thereof to said one terminal of said high frequency power supply; and means for connecting both plates of at least one other of said other pairs of plates to said other terminals of said high frequency power supply.

6. A multiple layer capacitor as defined in claim 5, further comprising means for connecting said end plates respectively to said one and said other terminals of said high frequency power supply.

7. A multiple layer capacitor as defined in claim 5, further comprising means for connecting said end plates respectively to the same one of the terminals of said high frequency power supply.

8. A multiple layer capacitor as defined in claim 5, wherein all of said plates in said capacitor physically constitute an even number of electrodes, while effectively comprising an odd number of electrodes.

9. A multiple layer capacitor as defined in claim 5, wherein all of said plates in said capacitor are sub equal in length and width and are of negligible thickness.

10. A multiple layer capacitor as defined in claim 5, wherein the spacing between said pair of plates is the same and equal to the spacing between said end plates and adjacent pairs of plates.

11. A multiple layer capacitor as defined in claim 5, wherein the spacing between said pairs of plates is greater than the spacing between said end plates and adjacent pairs of plates.

12. A multiple layer capacitor as defined in claim 5, wherein the spacing between said pairs of plates is less than the spacing between said end plates and adjacent pairs of plates.

* * * * *